(12) United States Patent
Taylor et al.

(10) Patent No.: US 12,446,726 B2
(45) Date of Patent: Oct. 21, 2025

(54) HEIGHT ADJUSTOR FOR UPPER GRIDDLE PLATEN

(71) Applicant: AccuTemp Products, Inc., Fort Wayne, IN (US)

(72) Inventors: Dale W. Taylor, Hamilton, IN (US); Raymond R. Rudy, Huntington, IN (US); Cole Bruick, Fort Wayne, IN (US)

(73) Assignee: Accu Temp Products, Inc., Fort Wayne, IN (US)

( * ) Notice: Subject to any disclaimer, the term of this patent is extended or adjusted under 35 U.S.C. 154(b) by 797 days.

(21) Appl. No.: 17/837,541

(22) Filed: Jun. 10, 2022

(65) Prior Publication Data

US 2023/0397762 A1    Dec. 14, 2023

(51) Int. Cl.
*A47J 37/06*    (2006.01)

(52) U.S. Cl.
CPC ....... *A47J 37/0611* (2013.01); *A47J 37/0676* (2013.01); *A47J 2037/0617* (2013.01)

(58) Field of Classification Search
CPC    A47J 37/0611; A47J 2037/0617; A47J 37/06; A47J 37/0676; A47J 37/049; A47J 37/0629
USPC ......... 99/325, 331, 339, 342, 344, 349, 351, 99/372, 375, 376, 422, 425
See application file for complete search history.

(56) References Cited

U.S. PATENT DOCUMENTS

2016/0270593 A1\*    9/2016    Ogawa ................. A47J 37/0611

\* cited by examiner

*Primary Examiner* — Phuong T Nguyen
(74) *Attorney, Agent, or Firm* — Faegre Drinker Biddle & Reath LLP (57) ABSTRACT

A griddle system including a height adjuster setting the gap between the upper platen of an upper platen assembly and a lower platen in a closed position of the upper platen is disclosed.

12 Claims, 6 Drawing Sheets

HEIGHT ADJUSTOR FOR UPPER GRIDDLE PLATEN

BACKGROUND

1. Technical Field

The present disclosure is directed to a griddle and, in particular, to a griddle with an upper platen. More particularly, the present disclosure is directed to a height adjustor for setting spacing of the upper platen above the lower platen in a cooking position of the upper platen.

2. Description of the Related Art

Griddles can feature upper platen assemblies suited for a variety of purposes, including searing and/or cooking from above with a heat source (see, e.g., U.S. patent application Ser. No. 17/534,807, the entire disclosure of which is hereby explicitly incorporated herein by reference). A height adjustor for setting spacing of the upper platen above the lower platen in a cooking position of the upper platen is desirable to facilitate setting the thickness of the cooked food product.

SUMMARY

The present disclosure provides a griddle system including a height adjustor for setting spacing of the upper platen above the lower platen in a cooking position of the upper platen. The height adjustor of the present disclosure is secured relative to the upper platen frame and is; therefore, adaptable to a variety of upper platen assemblies, including, without limitation the upper platen assemblies of co-pending U.S. patent application Ser. No. 16/410,677 entitled MODULAR GRIDDLE WITH SEARING DEVICE, the entire disclosure of which is hereby explicitly incorporated by reference herein.

In one form thereof, the present disclosure provides a griddle comprising: a lower platen; a heat source for heating the lower platen; an upper platen assembly rotatably connected to the lower platen, the upper platen assembly rotatable about a pivot axis from an open position to a closed position relative to the lower platen, whereby a food product can be loaded for cooking between the upper platen assembly and the lower platen when the upper platen assembly maintains the open position and the food product is positioned for cooking between the upper platen and the lower platen when the upper platen assembly maintains the closed position; and a height adjuster, comprising: a rotary input rotatably indexed for rotation to one of a plurality of indexed positions; a distal support threadably engaged with the rotary input and blocked from rotation so that a rotation of the rotary input is translated to an axial translation of the distal support, the distal support setting a gap between the lower platen and the upper platen assembly when the upper platen assembly maintains the closed position.

In embodiments, the rotary input comprises a rotary knob.

In embodiments, the upper platen assembly comprises a heated upper platen.

In embodiments, the height adjustor further comprises: a guide, the distal support reciprocatable in the guide to allow the axial translation of the distal support, the distal support rotationally keyed to the guide to block rotation of the distal support.

In embodiments, the height adjustor further comprises a detent operable to index the rotary input to one of the plurality of indexed positions.

In embodiments, the detent comprises a ball detent mechanism.

In another form thereof, the present disclosure provides a griddle comprising: a lower platen; a heat source for heating the lower platen; an upper platen assembly comprising an upper platen, the upper platen assembly rotatably connected to the lower platen, the upper platen assembly rotatable about a pivot axis from an open position to a closed position relative to the lower platen, whereby a food product can be loaded for cooking between the upper platen assembly and the lower platen when the upper platen assembly maintains the open position and the food product is positioned for cooking between the upper platen and the lower platen when the upper platen assembly maintains the closed position; and a height adjuster, comprising: an input; and a distal support establishing a gap between the lower platen and the upper platen when the upper platen assembly maintains the closed position, the distal support having a continuously adjustable support height relative to the upper platen assembly, the distal support moveable between a support height comprising a first height relative to the upper platen assembly at a first extent of travel of the distal support and a support height comprising a second height relative to the upper platen assembly at a second extent of travel of the distal support, the first extent of travel opposite the second extent of travel, the distal support continuously movable from the first height to the second height and from the second height to the first height, the input continuously adjustable to actuate the distal support from the first height to the second height and from the second height to the first height.

In embodiments, the input comprises a rotary knob.

In embodiments, the upper platen comprises a heated upper platen.

In embodiments, the height adjustor further comprises: a guide, the distal support reciprocatable in the guide from the first extent of travel to the second extent of travel and from the second extent of travel to the first extent of travel, the distal support rotationally keyed to the guide to block rotation of the distal support.

In embodiments, the input is indexed for rotation to one of a plurality of indexed positions.

In embodiments, the height adjustor further comprises a detent operable to index the rotary input to one of the plurality of indexed positions.

In an alternative form of the present disclosure, a method of adjusting a gap between an upper platen and a lower platen for cooking a food product is provided, the method comprising: continuously adjusting an input; the step of continuously adjusting an input setting a height of a distal support relative to an upper platen assembly; and the step of setting the height of the distal support relative to an upper platen assembly establishing a gap between the lower platen and the upper platen, which forms a part of the upper platen assembly, when the upper platen assembly maintains a closed, cooking position.

In embodiments, the method further comprises: adjusting the position of one of the first pin and the second pin to adjust a counterbalance force supplied by the counterbalance. In embodiments, the adjusting step comprises a step of moving a stop surface cooperating with one of the first pin and the second pin to set the counterbalance force supplied by the counterbalance to a second position different from a first position occupied by the stop surface prior to the adjusting step.

In embodiments, the step of continuously adjusting an input comprises rotating the input.

In embodiments, the step of setting a height of the distal support relative to the upper platen assembly comprises: guiding the distal support for axial displacement with a guide, while blocking rotation of the distal support with the guide.

In embodiments, the step of setting the height of the distal support relative to the upper platen assembly comprises setting the input to an indexed position.

In embodiments, the step of setting the input to the indexed position comprises engaging a ball detent mechanism.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates an embodiment of the invention, the embodiment disclosed below is not intended to be exhaustive or to be construed as limiting the scope of the invention in any manner.

DETAILED DESCRIPTION

Figure 1:
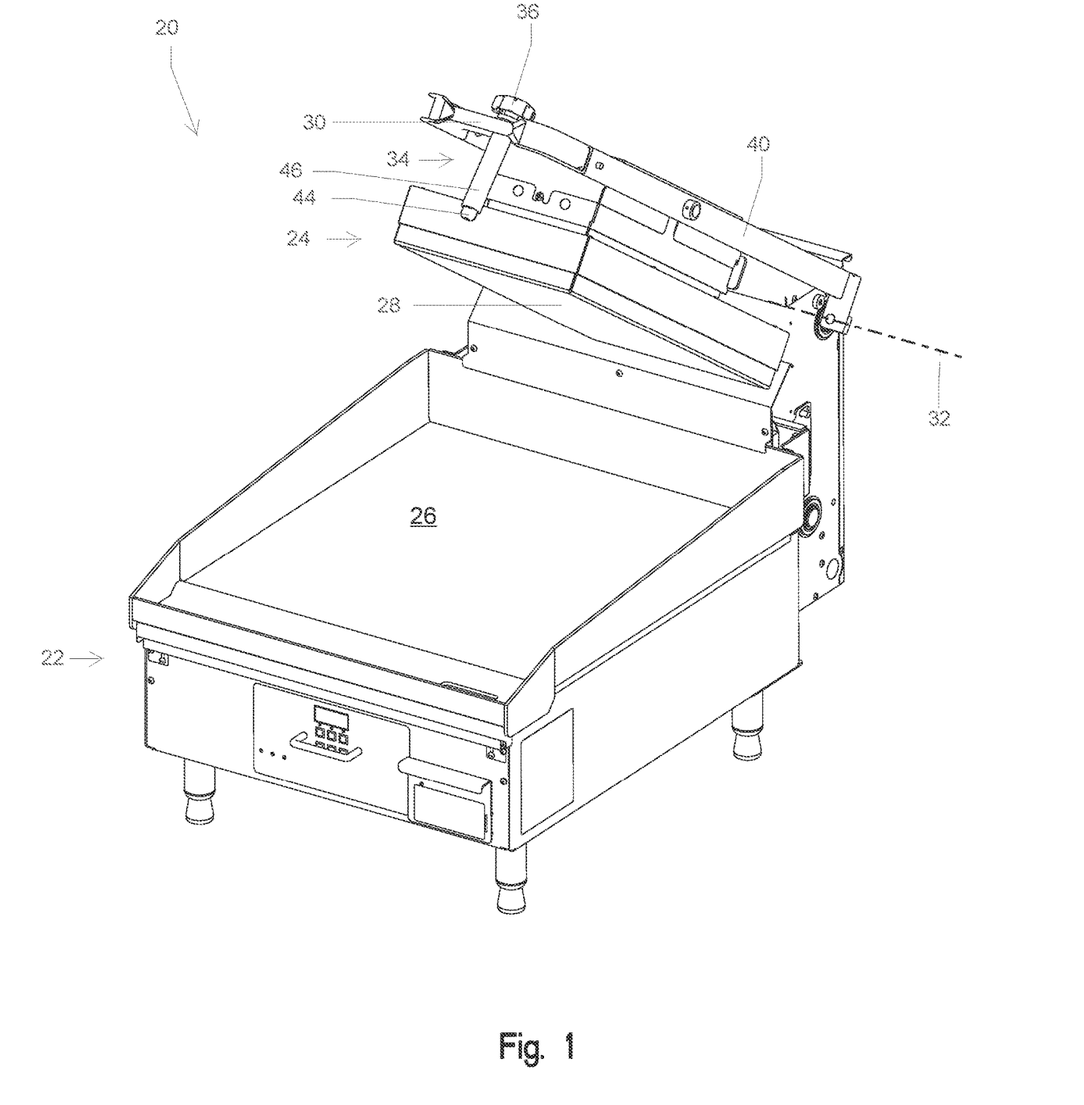
FIG. 1 is a perspective view of a griddle incorporating an upper platen assembly having a height adjustor in accordance with the present disclosure, with the upper platen shown in an open, food loading position maximally spaced from the lower platen.
Figure 2:
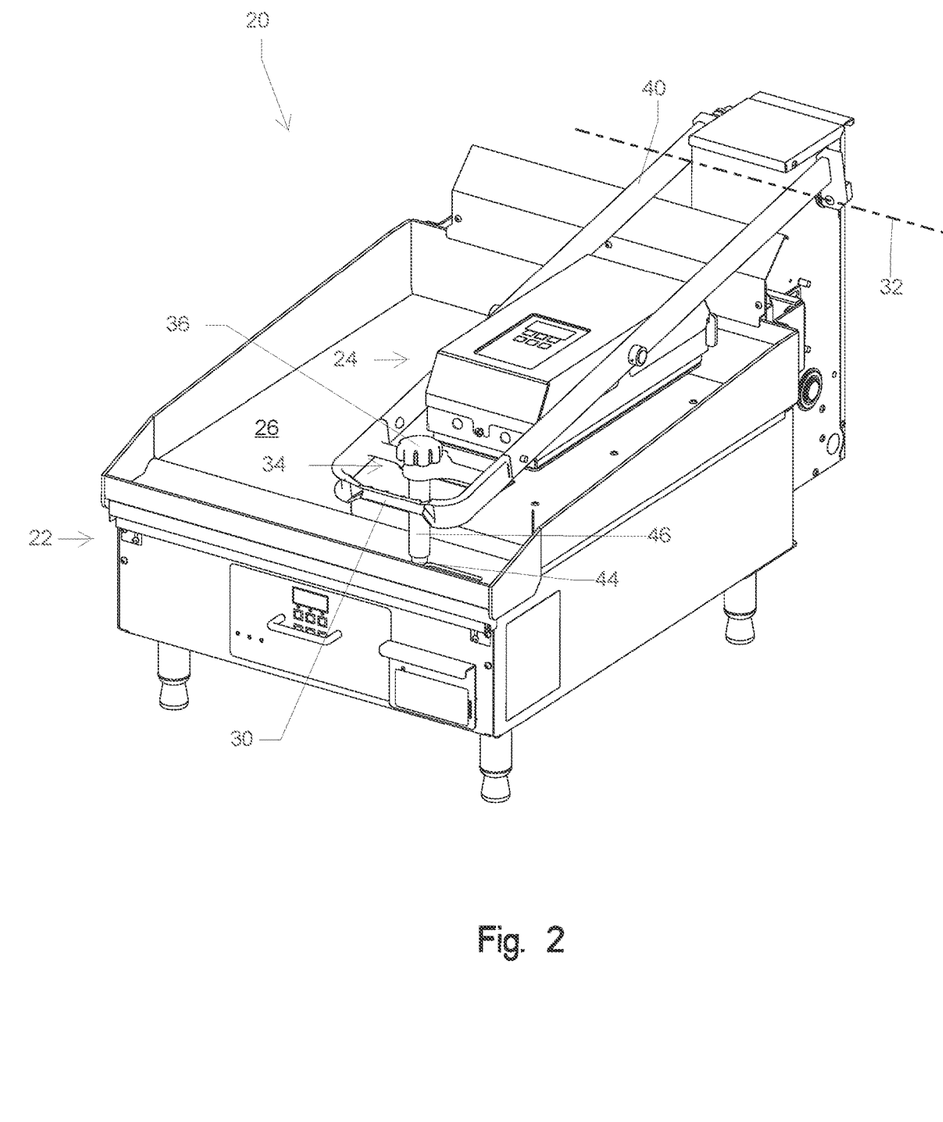
FIG. 2 is a perspective view of the griddle of FIG. 1 with the upper platen assembly in a closed, cooking position in close proximity to the lower platen of the griddle, with the height adjustor setting the gap between the upper platen carried by the upper platen assembly and the lower platen presented as the cooking surface of the underlying griddle.
Figure 3:
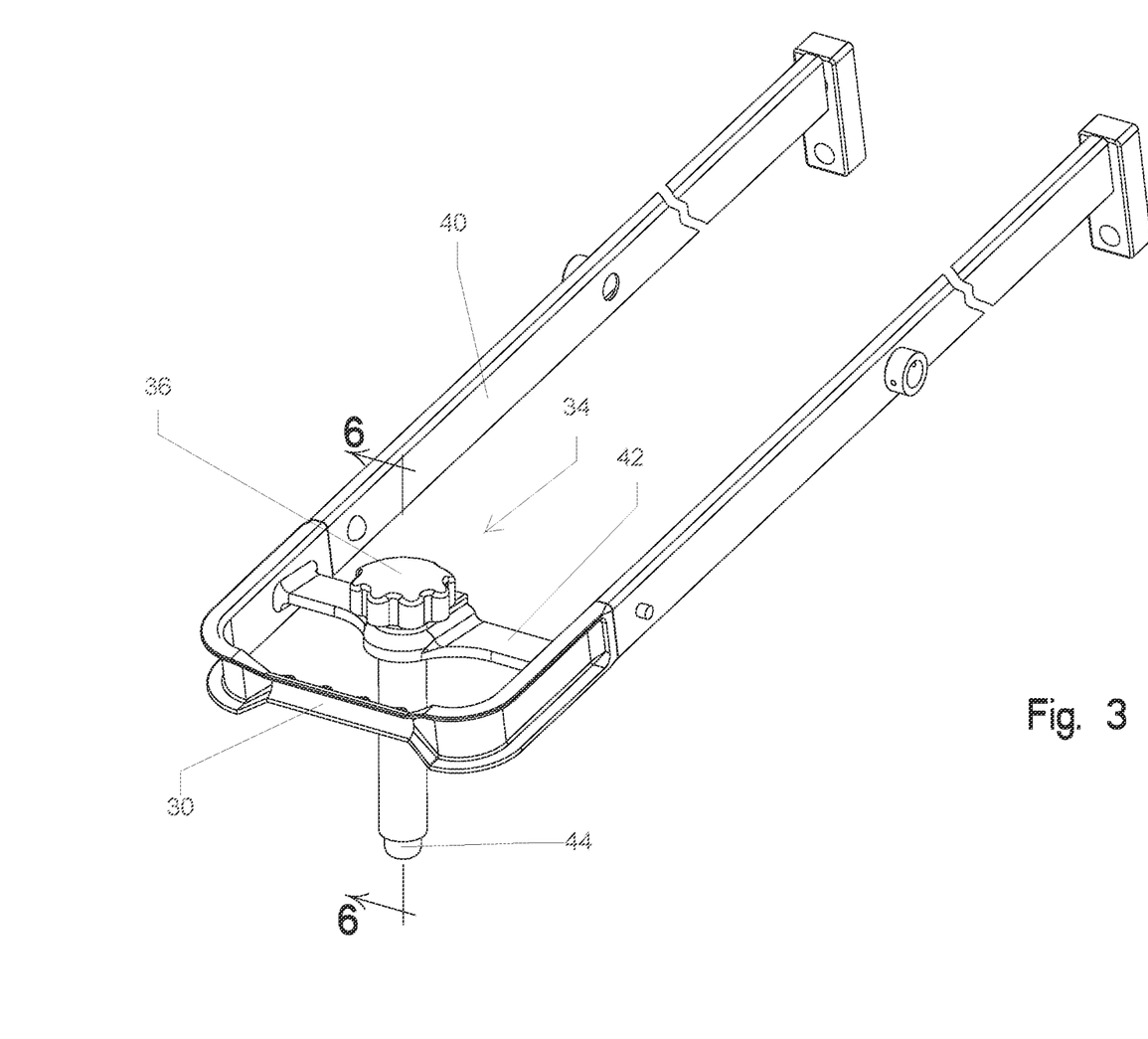
FIG. 3 is a perspective view of the upper platen frame and height adjustor of the present disclosure, with the upper platen removed from the upper platen frame.

FIGS. 1 and 2 illustrate griddle assembly 20 including griddle 22 and upper platen assembly 24. Griddle 22 presents a cooking surface in the form of lower platen 26 facing upward toward upper platen assembly 24. Upper platen assembly 24 presents a food engaging surface in the form of upper platen 28 facing downward toward griddle 22. In the embodiment illustrated, upper platen assembly 24 includes a heater for heating upper platen 28 for active cooking. In alternative configurations, upper platen 28 may not be heated. Upper platen 28 may, e.g., be used to compress food items for cooking with or without upper platen 28 being heated.

In the open position of upper platen assembly 24 shown in FIG. 1, a food item can be placed on lower platen 26 such that upper platen assembly 24 can be rotated about pivot axis 32 from the open position of FIG. 1 to the closed position of FIG. 2 to position upper platen 28 atop the food item for cooking the food item. Lower platen 26 is a heated cooking surface in the exemplification described herein. From the closed position illustrated in FIG. 2, upper platen assembly 24 can be rotated about pivot axis 32 to the open position illustrated in FIG. 1, allowing loading/unloading of food items positioned on lower platen 26. Upper platen assembly 24 can be rotated, e.g., through an arc of up to 90° between its open and closed positions. Alternative upper platen assemblies 24 may be rotated through an arc about pivot axis 32 of, for example, 45°, 50°, 55°, 60°, 65°, 70°, 75°, 80°, 85°, or 90° when positioning upper platen assembly 24 from the closed position to the open position and vice versa.

To rotate upper platen assembly 24 between the closed position and the open position, a force is applied by an operator to handle 30 to rotate upper platen assembly 24 about pivot axis 32. A counterbalance such as the one disclosed in co-pending U.S. patent application Ser. No. 17/696,759, filed Mar. 16, 2022 and entitled COUNTERBALANCE FOR UPPER GRIDDLE PLATEN, the entire disclosure of which is hereby explicitly incorporated herein by reference, may be implemented to reduce the force on handle 30 needed to articulate upper platen 24 between the closed position and the open position. Additionally, upper platen 28 may be a self-leveling platen such as one of the self-leveling upper platens disclosed in co-pending U.S. Patent Application Publication No. 2019/0357727 filed May 13, 2019 and entitled MODULAR GRIDDLE WITH SEARING DEVICE, the entire disclosure of which is hereby explicitly incorporated herein by reference.

Referring to FIGS. 1-6, height adjustor 34 functions to set the gap between upper platen 28 and lower platen 26 in the closed position of upper platen assembly 24, as shown in FIG. 2. Upper platen assembly 24 includes frame 40 from which upper platen 28 downwardly extends. Referring to FIGS. 3-6, frame 40 includes transverse support 42 from which distal support 44 extends to support frame 40 and thereby upper platen 28 above lower platen 26.

As upper platen assembly 24 is rotated from the open position shown in FIG. 1 to the closed position shown in FIG. 2, travel of upper platen assembly 24 is limited by engagement of distal support 44 with griddle 22. Stated another way, travel of upper platen assembly 24 from the open position to the closed position stops when distal support contacts griddle 22. Therefore, the distance that distal support extends from frame 40 sets the gap between upper platen 28 and lower platen 26 in the closed position of upper platen assembly 24 shown in FIG. 2.

Height adjustor 34 features a rotary input in the form of rotary knob 36. Rotary knob 36 is rotatable about longitudinal axis 38 (FIG. 4) to adjust the distance that distal support 44 extends from frame 40. More particularly, rotary knob 36 is continuously rotatable to actuate distal support 44 from a first extent of travel of distal support 44 to a second extent of travel of distal support. Rotary knob 36 may be indexed to maintain certain rotary positions, while remaining continuously variable.

Figure 4:
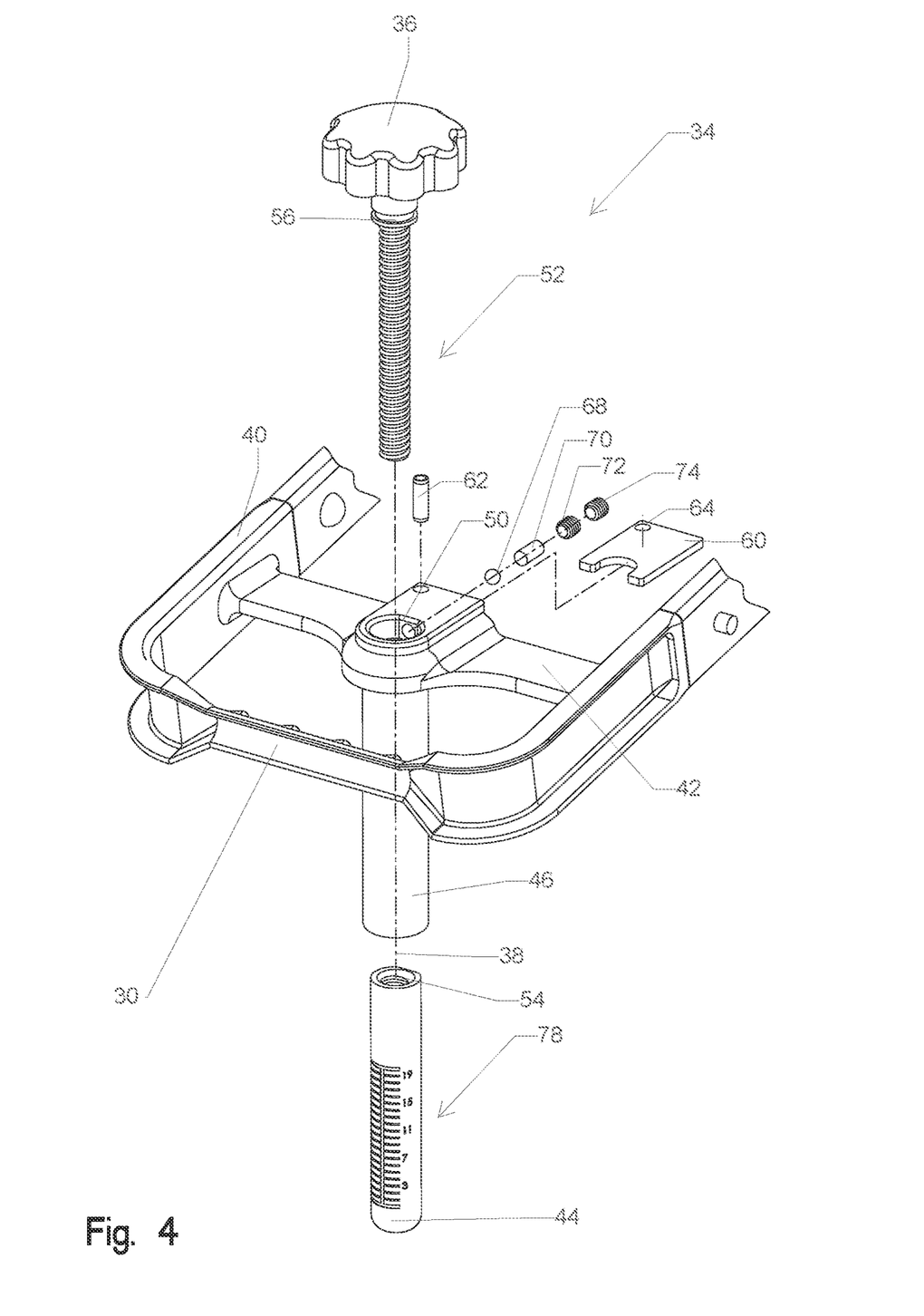
FIG. 4 is a partial front perspective, exploded view showing the operator end of the upper platen frame and the components of the height adjustor.
Figure 5:
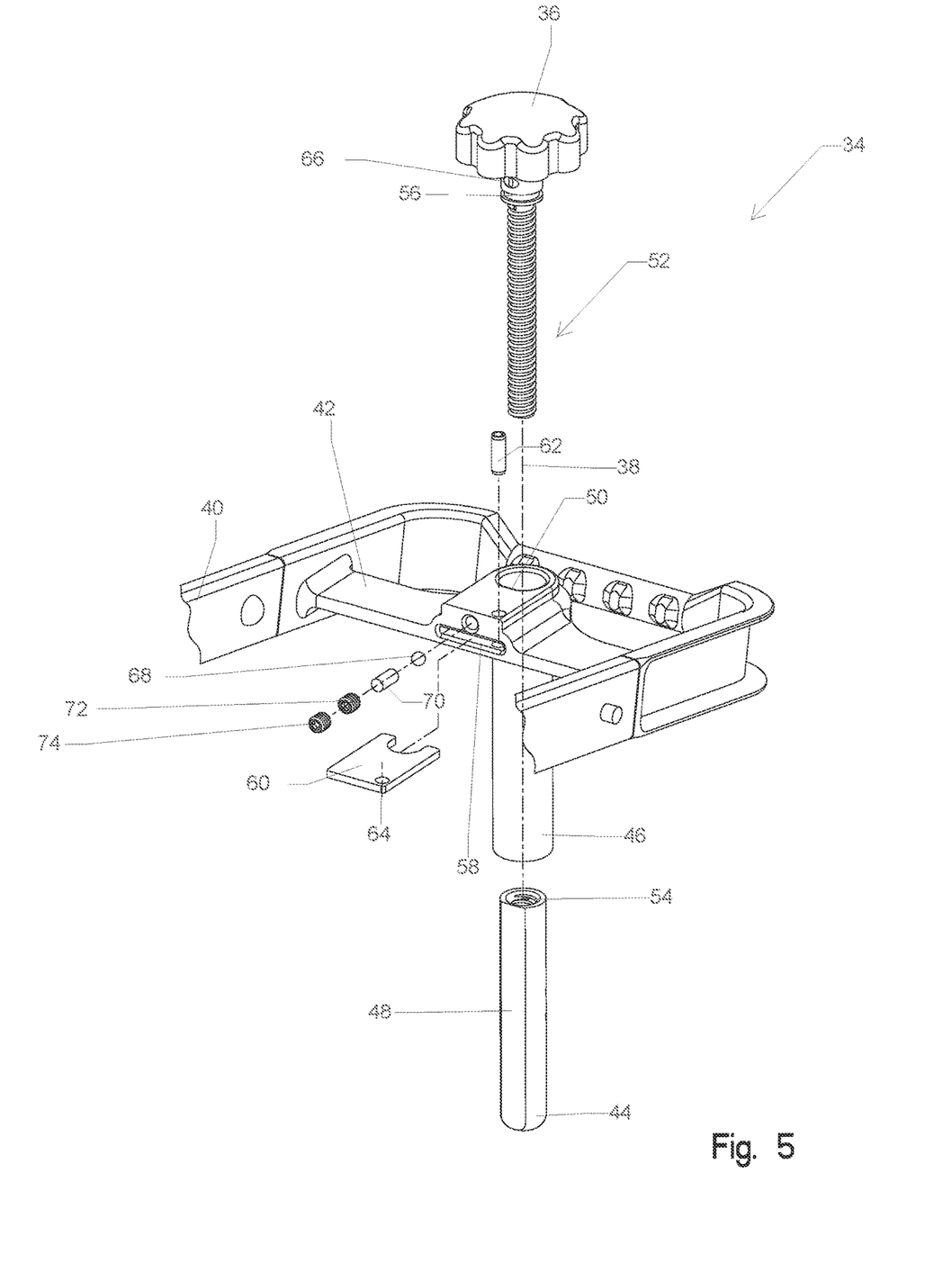
FIG. 5 is a partial back perspective, exploded view showing the operator end of the upper platen frame and the components of the height adjustor.

Distal support 44 is axially translatable but not rotatable within guide 46, which extends downwardly from transverse support 42. To prevent relative rotation between distal support 44 and guide 46, distal support 44 is rotationally keyed to guide 46. Distal support 44 includes flat 48 (FIG. 5) which defines a chord of a circle residing in a plane orthogonal to rotational axis 38 of rotary knob 36, which coincides with the longitudinal axis of distal support 44 when distal support 44 maintains operable position for reciprocation in guide 46. Guide 46 includes complementary flat 50 (FIGS. 4 and 5). Flat 50 of guide 46 defines a chord of a circle residing in a plane orthogonal to rotational axis 38 of rotary knob 36, which coincides with the longitudinal axis of guide 46. Flats 48, 50 cooperate to block rotation of distal support 44 in guide 46. In alternative configurations, a key/keyway combination may be utilized to block relative rotation between distal support 44 and guide 46.

Figure 6:
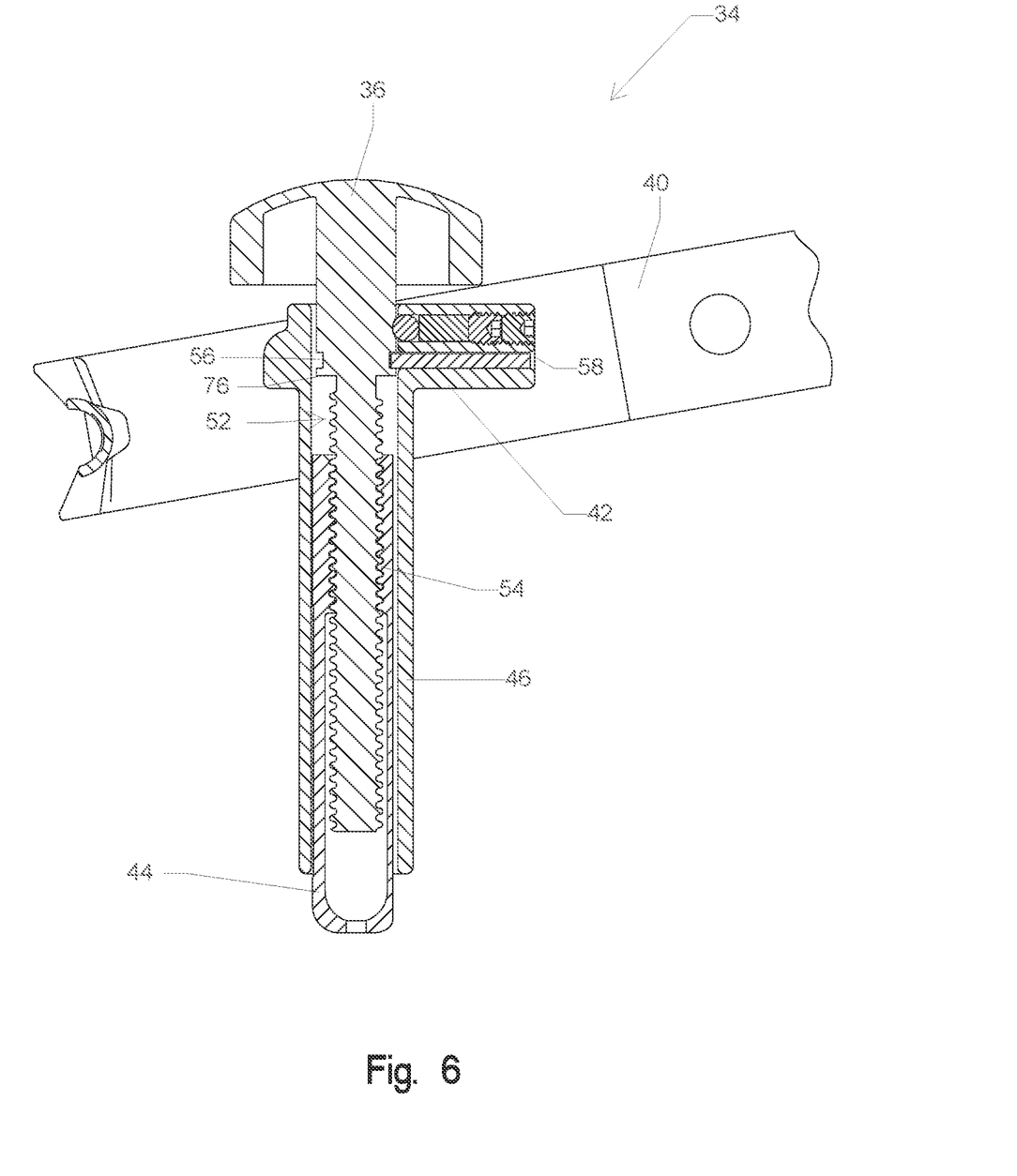
FIG. 6 is a sectional view of the operator end of the upper platen frame and the height adjustor of the present disclosure.

Rotary knob 36 has threaded stud 52 extending therefrom as illustrated in FIGS. 4-6. Threaded stud 52 features a thread form compatible internal threading 54 of distal support 44 such that threaded stud 52 is threadably engageable with distal support 44. While distal support 44 is translatable along longitudinal axis 38, threaded stud 52 is blocked from such translation. Rotation of rotary knob 36 operates to axially displace distal support 44 from a first height relative to upper platen assembly 24 to a second height relative to upper platen assembly 24. For example, distal support 44 may have a first extent of travel associated with the first height, the first extent of travel defined when distal support 44 bottoms out on shoulder 76 and/or when scale 78 is set to the shortest register (e.g., the zero line). The second height may be associated with a second height defined, e.g., by the tallest demarcation of scale 78. Scale is read at the height exposed from the distal end of guide 46.

Intermediate rotary knob 36 and threaded stud 52 is annular groove 56. Annular groove 56 is nominally perpendicular to rotational axis 38 of rotary knob 36. Transverse support 42 includes slot 58 which intersects the longitudinal opening in guide 46. With threaded stud 52 positioned in the longitudinal opening in guide 46, lock 60 is inserted into slot 58 and groove 56. With lock 60 occupying groove 56 and slot 58, roll pin 62 is positioned into transverse support 42 and, simultaneously, into aperture 64 of lock 60 where it is held by friction to hold lock 60 in locking position blocking axial displacement of threaded stud 52 in the longitudinal opening in guide 46.

With distal support 44 positioned in the longitudinal opening in guide 46, which can only be done with flat 48 sharing a rotational orientation about rotational axis 38 with flat 50, and threadably engaged with threaded stud 52, rotation of rotary knob 36 will cause axial displacement of guide 46. The pitch of the compatible threads will determine a correlation of rotation of rotatory knob to axial displacement. For example, rotation of rotary knob 36 through 360 degrees may yield a 4 mm axial displacement of guide 46. In this example, 90 degrees of rotation will yield a 1 mm axial displacement of guide 46. Alternative ratios of rotation to axial displacement are achievable.

While rotary knob 36 is continuously adjustable, resulting in continuously adjustment of distal support 44, rotary knob 36 is indexed to stop at one or more set rotational positions. Specifically, a ball detent mechanism including depression 66, ball 68, spring 70, and set screw 72 indexes rotary knob to a set rotational position. Spring 70 may be a resilient polymer spring or any of a variety of metal springs, such as a helical spring. In the exemplification shown, rotary knob includes a single depression 66 operable to index rotary knob to one of a plurality of indexed positions, each separated by 360 degrees of rotation. In alternative configurations, multiple depressions can be utilized. A second set screw 74 may be provided to prevent backing out of set screw 72.

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. A griddle comprising:
   a lower platen;
   a heat source for heating the lower platen;
   an upper platen assembly rotatably connected to the lower platen, the upper platen assembly rotatable about a pivot axis from an open position to a closed position relative to the lower platen, whereby the upper platen assembly and the lower platen are configured to receive a food product when the upper platen assembly maintains the open position and the food product is positioned for cooking between the upper platen and the lower platen when the upper platen assembly maintains the closed position; and
   a height adjuster, comprising:
      a rotary input rotatably indexed for rotation to one of a plurality of indexed positions;
      a distal support threadably engaged with the rotary input and blocked from rotation so that a rotation of the rotary input is translated to an axial translation of the distal support, the distal support setting a gap between the lower platen and the upper platen assembly when the upper platen assembly maintains the closed position.

2. The griddle of claim 1, wherein the rotary input comprises a rotary knob.

3. The griddle of claim 1, wherein the upper platen assembly comprises a heated upper platen.

4. The griddle of claim 1, wherein the height adjuster further comprises: a guide, the distal support reciprocatable in the guide to allow the axial translation of the distal support, the distal support rotationally keyed to the guide to block rotation of the distal support.

5. The griddle of claim 1, wherein the height adjuster further comprises a detent operable to index the rotary input to one of the plurality of indexed positions.

6. The griddle of claim 5, wherein the detent comprises a ball detent mechanism.

7. A griddle comprising:
   a lower platen;
   a heat source for heating the lower platen;
   an upper platen assembly comprising an upper platen, the upper platen assembly rotatably connected to the lower platen, the upper platen assembly rotatable about a pivot axis from an open position to a closed position relative to the lower platen, whereby the upper platen assembly and the lower platen are configured to receive a food product when the upper platen assembly maintains the open position and the food product is positioned for cooking between the upper platen and the lower platen when the upper platen assembly maintains the closed position; and
   a height adjuster, comprising:
      an input; and
      a distal support establishing a gap between the lower platen and the upper platen when the upper platen assembly maintains the closed position, the distal support having a continuously adjustable support height relative to the upper platen assembly, the distal support moveable between a support height comprising a first height relative to the upper platen assembly at a first extent of travel of the distal support and a support height comprising a second height relative to the upper platen assembly at a second extent of travel of the distal support, the first extent of travel opposite the second extent of travel, the distal support continuously movable from the first height to the second height and from the second height to the first height, the input continuously adjustable to actuate the distal support from the first height to the second height and from the second height to the first height.

8. The griddle of claim 7, wherein the input comprises a rotary knob.

9. The griddle of claim 7, wherein the upper platen comprises a heated upper platen.

10. The griddle of claim 7, wherein the height adjustor further comprises:
   a guide, the distal support reciprocatable in the guide from the first extent of travel to the second extent of travel and from the second extent of travel to the first extent of travel, the distal support rotationally keyed to the guide to block rotation of the distal support.

11. The griddle of claim 7, wherein the input is indexed for rotation to one of a plurality of indexed positions.

12. The griddle of claim 11, wherein the height adjustor further comprises a detent operable to index the rotary input to one of the plurality of indexed positions.

* * * * *